United States Patent
Van Horn et al.

(10) Patent No.: US 9,781,681 B2
(45) Date of Patent: Oct. 3, 2017

(54) FLEET POWER MANAGEMENT THROUGH INFORMATION STORAGE SHARING

(71) Applicant: Hand Held Products, Inc., Fort Mill, SC (US)

(72) Inventors: Erik Van Horn, Ocean View, NJ (US); Sean Philip Kearney, Marlton, NJ (US); Patrick Anthony Giordano, Glassboro, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 149 days.

(21) Appl. No.: 14/836,030

(22) Filed: Aug. 26, 2015

(65) Prior Publication Data

US 2017/0064634 A1    Mar. 2, 2017

(51) Int. Cl.
*H04W 52/02* (2009.01)
*H04W 4/18* (2009.01)

(52) U.S. Cl.
CPC ......... *H04W 52/0261* (2013.01); *H04W 4/18* (2013.01); *H04W 52/0209* (2013.01)

(58) Field of Classification Search
CPC ......... H04W 52/0261; H04W 52/0209; H04W 52/0216; H04W 52/0229; H04W 4/12; H04W 4/18
See application file for complete search history.

(56) References Cited

U.S. PATENT DOCUMENTS 6,832,725 B2   12/2004   Gardiner et al.
7,128,266 B2   10/2006   Zhu et al.
(Continued)

FOREIGN PATENT DOCUMENTS

WO   2013163789 A1   11/2013
WO   2013173985 A1   11/2013
(Continued)

OTHER PUBLICATIONS

Microsoft; "Intelligent Offload to Improve Battery Lifetime of Mobile Devices", downloaded Nov. 25, 2015 from http://www.doc.ic.ac.uk/icep/presentations/ranveer-chandra.pdf; 67 pages.
(Continued)

*Primary Examiner* — Habte Mered
(74) *Attorney, Agent, or Firm* — Additon, Higgins & Pendleton, P.A.

(57) ABSTRACT

Systems for power management of a fleet of devices through information storage sharing are described. According to one embodiment, each one of a group of networked devices offloads information to a substantially powered hub device before entering a low power consumption mode and receives the respective information back from the hub device upon wake. Another embodiment describes a system of networked devices in which each one of the networked devices offloads information to a selected networked device before entering a sleep mode and receives the respective information back from that selected networked device after entering a wake mode. Another embodiment describes a system whereby the original selected networked device then backups to a new selected networked device if the original selected networked device needs to enter a low power consumption mode, and the other networked devices receive the respective information back from the new selected networked device.

20 Claims, 10 Drawing Sheets

(56) References Cited

U.S. PATENT DOCUMENTS

| | | | |
|---|---|---|---|
| 7,159,783 B2 | 1/2007 | Walczyk et al. | |
| 7,413,127 B2 | 8/2008 | Ehrhart et al. | |
| 7,717,342 B2 * | 5/2010 | Wang | H04W 76/023 235/462.01 |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,510,577 B2 | 8/2013 | Scott et al. | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |
| 8,918,564 B2 | 12/2014 | Caballero | |
| 8,925,818 B2 | 1/2015 | Kosecki et al. | |
| 8,939,374 B2 | 1/2015 | Jovanovski et al. | |

(56) References Cited

U.S. PATENT DOCUMENTS

| | | |
|---|---|---|
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2007/0063048 A1 | 3/2007 | Havens et al. |
| 2009/0134221 A1 | 5/2009 | Zhu et al. |
| 2010/0169678 A1 | 7/2010 | Kozuka |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |

(56) References Cited

U.S. PATENT DOCUMENTS

| | | |
|---|---|---|
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0237015 A1 | 8/2014 | Bruins et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0103767 A1 | 4/2015 | Kim et al. |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0156717 A1* | 6/2015 | Narasimha ........ H04W 52/0209 370/311 |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2017/0055195 A1* | 2/2017 | Ingale ................... H04W 36/22 |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 13/367,978, filed Feb. 7, 2012, (Feng et al.); now abandoned.

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/529,857 for Barcode Reader With Security Features filed Oct. 31, 2014 (Todeschini et al.); 32 pages.

U.S. Appl. No. 14/519,195 for Handheld Dimensioning System With Feedback filed Oct. 21, 2014 (Laffargue et al.); 39 pages.

U.S. Appl. No. 14/519,211 for System and Method for Dimensioning filed Oct. 21, 2014 (Ackley et al.); 33 pages.

U.S. Appl. No. 14/519,233 for Handheld Dimensioner With Data-Quality Indication filed Oct. 21, 2014 (Laffargue et al.); 36 pages.

U.S. Appl. No. 14/533,319 for Barcode Scanning System Using Wearable Device With Embedded Camera filed Nov. 5, 2014 (Todeschini); 29 pages.

U.S. Appl. No. 14/748,446 for Cordless Indicia Reader With a Multifunction Coil for Wireless Charging and EAS Deactivation, filed Jun. 24, 2015 (Xie et al.); 34 pages.

(56) References Cited

OTHER PUBLICATIONS

U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
Extended European Search Report in counterpart European Application No. 16185191.0 dated Dec. 19, 2016, pp. 1-7.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader, filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.

U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.

* cited by examiner

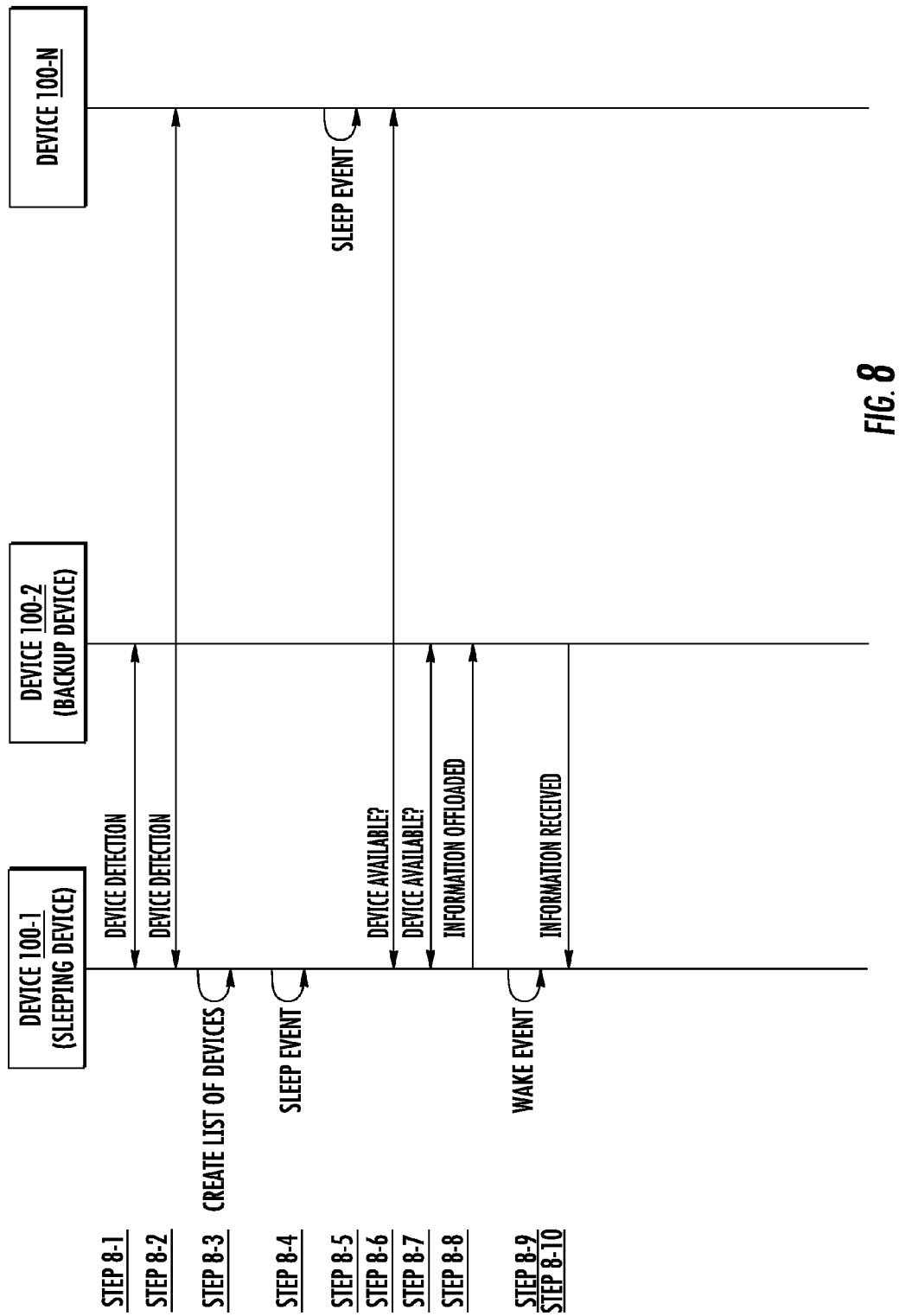

FLEET POWER MANAGEMENT THROUGH INFORMATION STORAGE SHARING

FIELD OF THE INVENTION

The present invention relates to information and power management in connected devices.

BACKGROUND

The Internet of Things (IoT) refers to networks of devices with embedded electronics, software, sensors, and connectivity that enable the widespread collecting, delivery, and sharing of information. In order for these networks of devices to be most effective, they will need to employ power management schemes. The ability of these devices to enter into low power consumption modes will be essential to ensuring their ability to operate when needed between charging cycles. Given that one of the key aspects of these networks of devices is their ability to share information, there is a question about what to do with the information from these devices during these power management cycles.

Therefore, a need exists for a system where information can be offloaded by devices in a network as they enter low power consumption states.

SUMMARY

Accordingly, one aspect of the present invention discloses a system, comprising: a first device comprising: a first communication interface; a first control system communicatively coupled to the first communication interface and comprising at least one first hardware processor and a first memory storing program codes operable to: receive a first sleep event; send first information to a third device; enter a first sleep mode; receive a first wake event; and receive the first information from the third device; and a second device comprising: a second communication interface; a second control system communicatively coupled to the second communication interface and comprising at least one second hardware processor and a second memory storing program codes operable to: receive a second sleep event; send second information to the third device; enter a second sleep mode; receive a second wake event; and receive the second information from the third device; and a substantially powered third device comprising: a third communication interface; a third control system communicatively coupled to the third communication interface and comprising at least one third hardware processor and a third memory storing program codes operable to: receive the first information from the first device; receive the second information from the second device; send the first information to the first device after the first wake event; and send the second information to the second device after the second wake event.

A further aspect of the present invention describes a system, comprising: a first device comprising: a first communication interface; a first control system communicatively coupled to the first communication interface and comprising at least one first hardware processor and a first memory storing program codes operable to: receive a first sleep event; identify a third device as available to receive first information; send the first information to the third device; enter a first sleep mode; receive a first wake event; and receive the first information from the third device; and a second device comprising: a second communication interface; a second control system communicatively coupled to the second communication interface and comprising at least one second hardware processor and a second memory storing program codes operable to: receive a second sleep event; identify the third device as available to receive second information; send the second information to the third device; enter a second sleep mode; receive a second wake event; and receive the second information from the third device; and a third device comprising: a third communication interface; a third control system communicatively coupled to the third communication interface and comprising at least one third hardware processor and a third memory storing program codes operable to: receive the first information from the first device; receive the second information from the second device; send the first information to the first device after the first wake event; and send the second information to the second device after the second wake event.

In other exemplary embodiments, the first, second, and third devices are selected from the group consisting of: cellular telephones, smart phones, personal digital assistants, tablets, pagers, two-way radios, netbooks, barcode scanners, radio frequency identification (RFID) readers, intelligent sensors, tracking devices, and smart tags.

In further exemplary embodiments, the first and second information are selected from the group comprising: information about the operation of the device, the total operational time of the device, information about the timing and duration of sleep and wake cycles of the device, information about installed software applications and operating systems and respective patches or updates, information about the state and operation of the sensors, data collected by the sensors, data collected from touch screens or keypads of the device, and information on communications between the device and other devices in the network.

In still further exemplary embodiments, the first and second sleep events are selected from a group consisting of: in response to input received at the first and second devices respectively, in response to a low power state at the first and second devices respectively, in response to a timer at the first and second devices respectively, in response to an absence of a proximity event at the first and second devices respectively, and in response to a message from the third device to the first and second devices respectively.

In other exemplary embodiments, the first and second wake events are selected from a group consisting of: in response to input received at the first and second devices respectively, in response to the addition of a power supply to the first and second device respectively, in response to a timer at the first and second devices respectively, in response to a proximity event at the first and second devices respectively, and in response to a message from the third device to the first and second devices respectively.

In more exemplary embodiments, identifying the third device as available to receive information comprises: sending a request to the third device for information regarding the power and storage status of the third device; receiving information regarding the power and storage status of the third device; and determining, using the information regarding the power and storage status of the third device, if the third device is available to receive information.

In some other exemplary embodiments, the third device is further operable to: receive a lightweight signal from the first device, wherein the lightweight signal is indicative of a wake state of the first device; and receive a lightweight signal from the second device, wherein the lightweight signal is indicative of a wake state of the second device.

In separate exemplary embodiments, the third device is further operable to: poll the first device to determine if the first device is in a wake state before sending the first information to the first device; and poll the second device to determine if the second device is in a wake state before sending the second information to the second device.

In other exemplary embodiments, the third device is further operable to: receive a request from the first device for the first information; and receive a request from the second device for the second information.

And in still additional embodiments, in sending the first information to the first device and the second information to the second device, the third device only sends a subset of the first and second information respectively.

And yet a further aspect of the present invention imparts a system, comprising: a first device comprising: a first communication interface; a first control system communicatively coupled to the first communication interface and comprising at least one first hardware processor and a first memory storing program codes operable to: receive a first sleep event; identify a third device as available to receive first information; send the first information to the third device; enter a first sleep mode; receive a first wake event; and receive the first information from a fourth device; and a second device comprising: a second communication interface; a second control system communicatively coupled to the second communication interface and comprising at least one second hardware processor and a second memory storing program codes operable to: receive a second sleep event; identify the third device as available to receive second information; send the second information to the third device; enter a second sleep mode; receive a second wake event; and receive the second information from the fourth device; and a third device comprising: a third communication interface; a third control system communicatively coupled to the third communication interface and comprising at least one third hardware processor and a third memory storing program codes operable to: receive the first information from the first device; receive the second information from the second device; receive a third sleep event; identify the fourth device as available to receive the first, the second, and third information; send the first, second, and third information to the fourth device; enter a third sleep mode; receive a third wake event; and receive the third information from the fourth device; and a fourth device comprising: a fourth communication interface; a fourth control system communicatively coupled to the fourth communication interface and comprising at least one fourth hardware processor and a fourth memory storing program codes operable to: receive the first, second, and third information from the third device; send the first information to the first device after the first wake event; send the second information to the second device after the second wake event; and send the third information to the third device after the third wake event.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 8 is a flow diagram outlining the flow of information between devices going through sleep/wake cycles and a device receiving offloaded information according to embodiments of the disclosed subject matter.

DETAILED DESCRIPTION

One embodiment of the present invention discloses a system of networked devices and a substantially powered hub device in which each one of the networked devices offloads information to the hub device before entering a low power consumption mode, i.e. a sleep mode, and receives the respective information back from the hub device after they enter a normal operation mode with normal power consumption, i.e. a wake mode. It should be noted, however, that in some embodiments, a power-on mode for a networked device may be a type of wake mode and similarly a power-off mode for a networked device may be a type of sleep mode.

Another embodiment of the present invention describes a system of networked devices in which each one of the networked devices offloads information to a selected networked device before entering a sleep mode and receives the respective information back from that selected networked device after entering a wake mode.

Another embodiment of the present invention describes a system of networked devices in which each one of the networked devices offloads information to an original selected networked device before entering a sleep mode and receives the respective information back from a new selected networked device, wherein the new selected networked device received the respective information from the original selected networked device before the original selected networked device entered a sleep mode.

Figure 1:
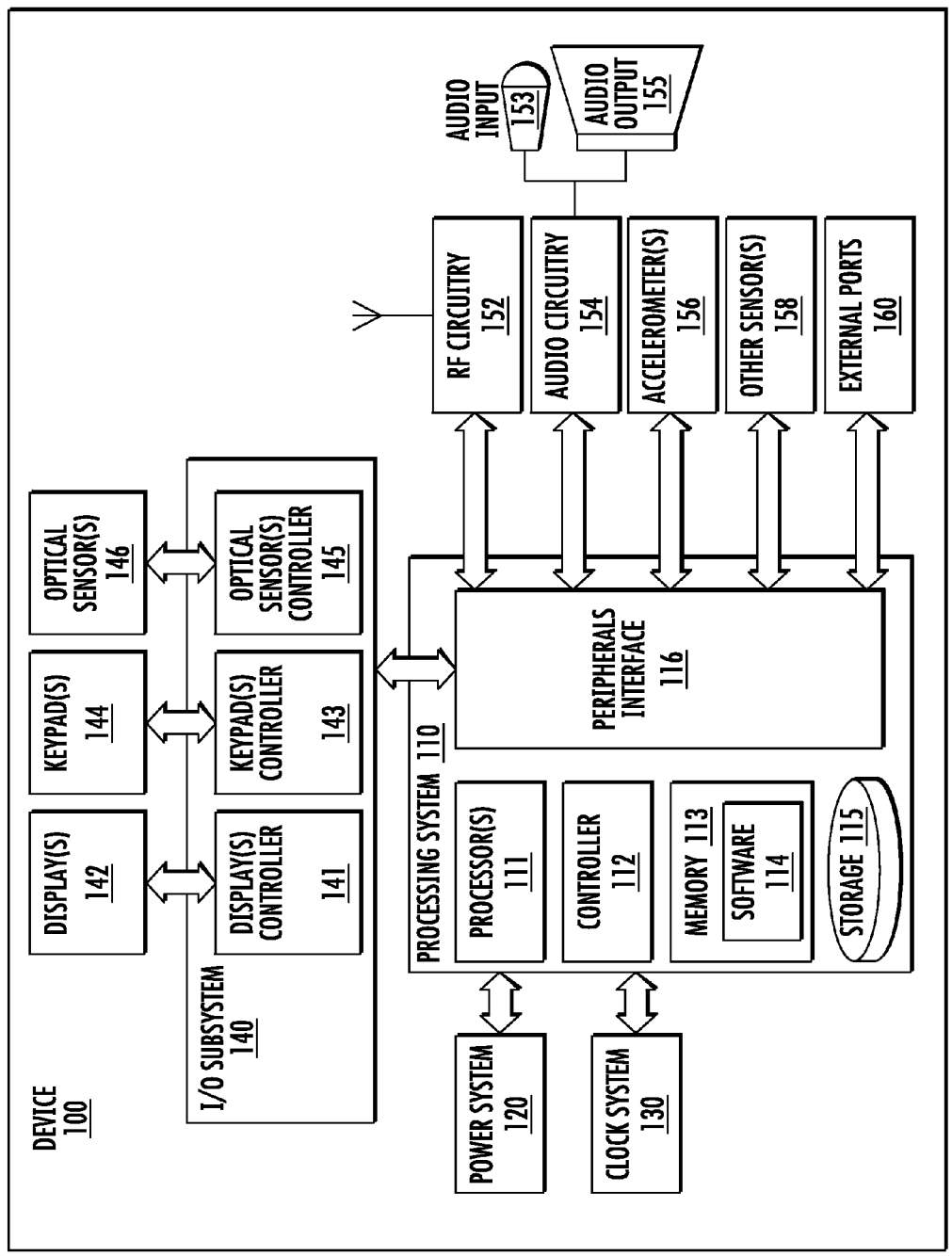
FIG. 1 is a block diagram of the hardware elements of a device according to embodiments of the disclosed subject matter.

FIG. 1 illustrates an exemplary networked device 100 for one embodiment of the present invention. The device 100 may include other components not shown in FIG. 1, nor further discussed herein for the sake of brevity. One having ordinary skill in the art will understand the additional hardware and software included but not shown in FIG. 1.

In general, networked device 100 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smart phones, personal digital assistants, tablets, pagers, two-way radios, netbooks, barcode scanners, radio frequency identification (RFID) readers, intelligent sensors, tracking devices, and other similar computing devices.

Figure 2A:
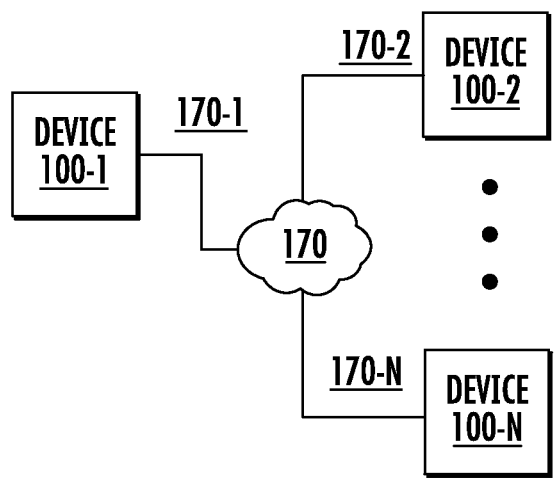
FIG. 2A and FIG. 2B are connectivity diagrams of the devices of the system in accordance with embodiments of the disclosed subject matter.

In some embodiments of the present invention, the device 100 of FIG. 1 can be networked or connected to other devices, generically designated device 100-X. In one embodiment, device 100-1 may be connected to other devices 100-2 through 100-N via a network 170, as shown in FIG. 2A. The network 170 may be any type of wide area network (WAN), such as the Internet, Local Area Network (LAN), or the like, or any combination thereof, and may include wired components, such as Ethernet, wireless components, such as LTE, Wi-Fi, Bluetooth, or near field communication (NFC), or both wired and wireless components, collectively represented by the data links 170-1 and 170-2 through 170-N.

Figure 2B:
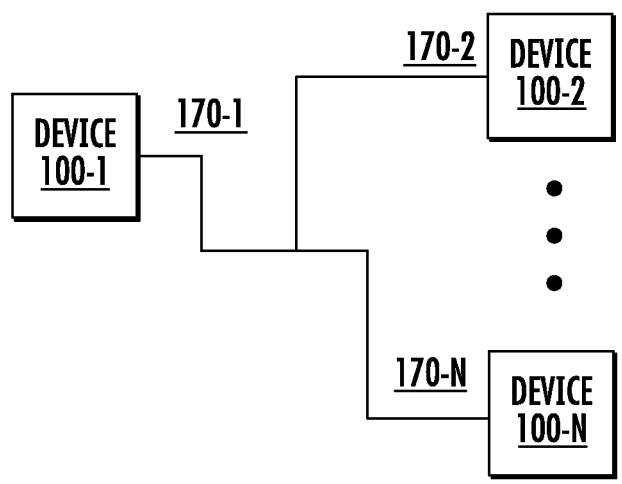

In other embodiments of the present invention, the device 100-1 may be connected to other devices 100-2 through 100-N via direct wired or direct wireless communication channels collectively represented by the data links 170-1 and 170-2 through 170-N, as shown in FIG. 2B. The wired communication channels 170-1 and 170-2 through 170-N of FIG. 2B may be Universal Serial Bus (USB), serial, Inter-Integrated Circuit (I2C), or other computer bus. The wireless communication channels 170-1 and 170-2 through 170-N of FIG. 2B may be wireless personal area networks such as those based on the IEEE 802.15.4 standards and the like.

In one embodiment, the devices 100-1 through 100-N are smart tags in a grocery store or supermarket aisle. In other embodiments, the devices 100-1 through 100-N are controls for a heating, ventilation, and air conditioning (HVAC) system for a building or residence. In these embodiments, FIG. 2A and FIG. 2B represent ways that the devices can be connected to allow the information of the devices to be shared with each other and retained as the devices enter low power consumption states.

In general, as shown, the networked device 100 of FIG. 1 includes a processing system 110 that includes one or more processors 111, such as Central Processing Units (CPUs), Application Specific Integrated Circuits (ASICs), and/or Field Programmable Gate Arrays (FPGAs), a memory controller 112, memory 113, which may include software 114, and other components that are not shown for brevity, such as busses, etc. The processing system may also include storage 115, such as a hard drive or solid state drive.

The processing system 110 also includes a peripherals interface 116 for communicating with other components of the device 100, including but not limited to, radio frequency (RF) circuitry 152, such as Wi-Fi and/or cellular communications circuitry such as wireless Ethernet, Bluetooth, and near field communication (NFC), audio circuitry 154 for the audio input component 153, such as a microphone, and audio output component 155, such as a speaker, one or more accelerometers 156, one or more other sensors 158, such as a location determination component such as a Global Positioning System (GPS) chip, and one or more external ports 160, which may be used for smart card readers or for wired connections such as wired Ethernet, USB, serial or I2C ports. The RF circuitry 152 and external ports 160 individually and collectively make up the communication interfaces for the device 100. The processing system 110 is also connected to a power system component 120 that is used to power the device 100, such as a battery or a power supply unit or an uninterruptible power supply (UPS). The processing system 110 is also connected to a clock system component 130 that controls a timer for use by the disclosed embodiments.

The peripherals interface 116 may also communicate with an Input/Output (I/O) subsystem 140, which includes a display(s) controller 141 operative to control display(s) 142. In some embodiments the display(s) 142 is a touch-sensitive display system, and the display(s) controller 141 is further operative to process touch inputs on the touch sensitive display 142. The I/O subsystem 140 may also include a keypad(s) controller 143 operative to control keypad(s) 144 on the device 100. The I/O subsystem 140 also includes an optical sensor(s) controller 145 operative to control one or more optical sensor(s) 146. The optical sensor(s) may include, but is not limited to, a barcode sensor, a camera, and an image sensor. The components of device 100 may be interconnected using one or more buses, represented generically by the arrows of FIG. 1, and may be mounted on a motherboard (not shown) or some other appropriate configuration.

Figure 3:
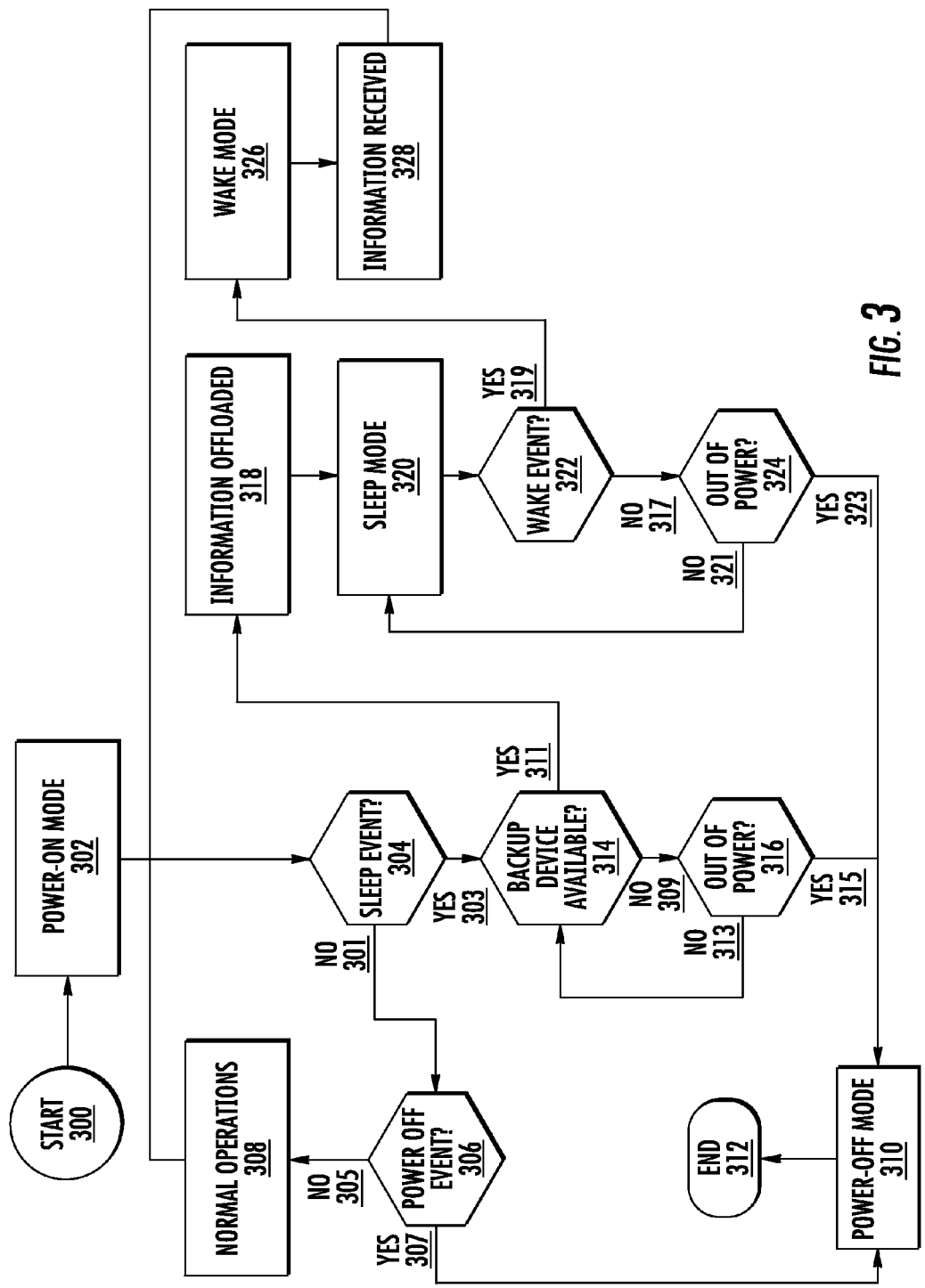
FIG. 3 is a flow chart for a device that goes through a sleep/wake cycle according to embodiments of the disclosed subject matter.

FIG. 3 is a flow chart for a networked device that goes through a sleep/wake cycle according to embodiments of the disclosed subject matter. More specifically, FIG. 3 is a flow chart for a networked device 100-1 that offloads/receives information to/from a substantially powered hub device 100-2. The process begins at Step 300 followed by Step 302 in which the networked device 100-1 enters a power-on mode or state. As discussed before, in some embodiments, a power-on mode for a networked device may be a type of wake mode and similarly a power-off mode for a networked device may be a type of sleep mode. The process continues to Step 304 in which the networked device 100-1 determines if it has received a sleep event.

In some embodiments, the sleep event occurs in response to an input received at the networked device 100-1, such as through the touch display 142 or the keypad 144. In other embodiments, the sleep event occurs in response to the low power level of the device as indicated by the power system 120, such as a low battery level for the device. In still further embodiments, the sleep event occurs in response to a timer as indicated by the clock system 130, such as a directive to sleep after three minutes of operation. In another embodiment, the sleep event occurs in response to an absence of a proximity event. For example, the networked device 100-1 enters a sleep mode in response to the absence of sound (as indicated by the audio input 153) or the absence of motion (as indicated by the optical sensors 146, such as traditional cameras or thermal cameras). In more embodiments, the sleep event occurs in response to a message sent from the hub device 100-2 to the networked device 100-1 over the communication interfaces, e.g. the RF circuitry 152 and/or external ports 160.

If no sleep event has been received (Path 301), then the device determines if it has received a power-off event (Step 306). The power-off event could be in response to input received at the networked device 100-1 to turn the device off or in response to a message received from the hub device 100-2 to power down. If there is a power-off event (Path 307), then the networked device 100-1 enters the power-off mode (Step 310) and the process is complete (Step 312). If there is no power-off event (Path 305), then the networked device 100-1 continues its normal operations (Step 308) and continues to check for sleep events (Step 304) and power-off events (Step 306). The normal operations of the networked device 100-1 depend on the nature and design of the device.

By way of a non-limiting example, in the case where the networked device 100-1 is a smart tag in a grocery store, the normal operation could include activities such as displaying product information, displaying pricing information, displaying sales or promotional information, issuing sales information (such as dispensing coupons), displaying device information, and collecting sensor data.

Returning to Step 304, if there is a sleep event (Path 303), then the networked device 100-1 checks to see if the backup device, e.g. the hub device 100-2, is available (Step 314). In this embodiment, the hub device 100-2 is substantially powered, meaning that it is plugged into a continuous power supply or an uninterruptible power supply. As such, this embodiment envisions that the hub device 100-2 will almost always be available to the networked device 100-1, except for maybe maintenance situations and force majeure. However, there could be instances there the communication between the hub device 100-2 and the networked device 100-1 is temporarily interrupted, and so the networked device 100-1 checks for the availability of the backup device (Step 314). If the hub device 100-2 is not available (Path 309) and as long as the networked device 100-1 is not out of power (Step 316, Path 313), then it will continue to try to reconnect with the hub device 100-2. If the networked device 100-1 runs out of power (Path 315), then it enters a power-off mode (Step 310) and the process is complete (Step 312).

If the hub device 100-2 is available to the networked device 100-1 (Path 311), then the networked device 100-1 offloads information to the hub device 100-2 (Step 318) and enters a sleep mode (Step 320).

The information offloaded by the networked device 100-1 depends on the nature and design of the device. The information includes, but is not limited to, information about the operation of the device, for example the total operational time of the device, information about the timing and duration of sleep and wake cycles of the device, information about installed software applications and operating systems and respective patches or updates, information about the state and operation of the sensors, data collected by the sensors, data collected from touch screens or keypads of the device, information on communications between the device and other devices in the network, and the like. In some embodiments, the information offloaded is the type of information that is not normally retained when a device enters sleep mode (such as information in transitory or volatile memory), but embodiments of the present invention are note limited thereto.

There are different embodiments for offloading information from the networked device 100-1 to the hub device 100-2. In some instances, the data may be transmitted as one or more files. In other embodiments, the information may be compressed to reduce the bandwidth of the transmission. In secure situations, the transmission may be encrypted or layered with other security mechanisms understood in the art to secure data transmissions.

During sleep mode, the networked device 100-1 checks for a wake event (Step 322). If there is no wake event (Path 317), then the networked device 100-1 checks to see if it is out of power (Step 324). If the networked device 100-1 is out of power (Path 323), then the networked device 100-1 enters the power-off mode (Step 310) and the process is complete (Step 312).

If the networked device 100-1 is not out of power (Path 321), then the device remains in sleep mode (Step 320) and checks again for a wake event (Step 322). If the networked device 100-1 receives a wake event (Path 319), then the device enters a wake mode (Step 326) and receives the all or some subset of information that had been previously offloaded to the hub device 100-2 (Step 328).

In some embodiments, the wake event occurs in response to an input received at the networked device 100-1, such as through the touch display 142 or the keypad 144. In other embodiments, the wake event occurs in response to the addition of a power supply to the device as indicated by the power system 120. In still further embodiments, the wake event occurs in response to a timer as indicated by the clock system 130, such as a directive to wake after three minutes in sleep mode. In another embodiment, the wake event occurs in response to a proximity event. For example, the networked device 100-1 enters a wake mode in response to the detection of sound (as indicated by the audio input 153) or the detection of motion (as indicated by the optical sensors 146, such as traditional cameras or thermal cameras). In more embodiments, the wake event occurs in response to a message sent from the hub device 100-2 to the networked device 100-1 over the communication interfaces, e.g. the RF circuitry 152 and/or external ports 160.

The information may be received by the networked device 100-1 from the hub device 100-2 according to a push or pull model or some combination therein. In some embodiments, when the networked device 100-1 wakes, it sends a lightweight or low-level wake signal to the hub device 100-2 which triggers the hub device 100-2 to send the information to the networked device 100-1. In other embodiments, the hub device 100-2 polls the networked devices to determine when they have returned to a wake state and promptly sends them the respective information. In yet further embodiments, the networked device 100-1 specifically requests the information to be returned from the hub device 100-2.

As indicated earlier, in some embodiments, the information returned to the networked device 100-1 from the hub device 100-2 may be a subset of the information originally offloaded. For example, in some embodiments, it may not be necessary to return information to the networked device 100-1 about installed software applications and operating systems and respective patches or updates, since the networked device 100-1 can readily obtain that information again. In other embodiments, though, the information offloaded to the hub device 100-2 may not be recoverable from the networked device 100-1 itself, such as information that had been collected from sensors on the device. It may be important to return such data for completion, such as returning information on sleep and wake cycles of the device so that a monthly profile of usage of the networked device 100-1 can be ascertained.

After the networked device 100-1 has entered a wake state (Step 326) and received the information it had offloaded (Step 328), the process repeats, and the networked device 100-1 continues to check for sleep events (Step 304) and power-off events (Step 306) and proceeds with normal operations (Step 308) while those events are absent.

Figure 4:
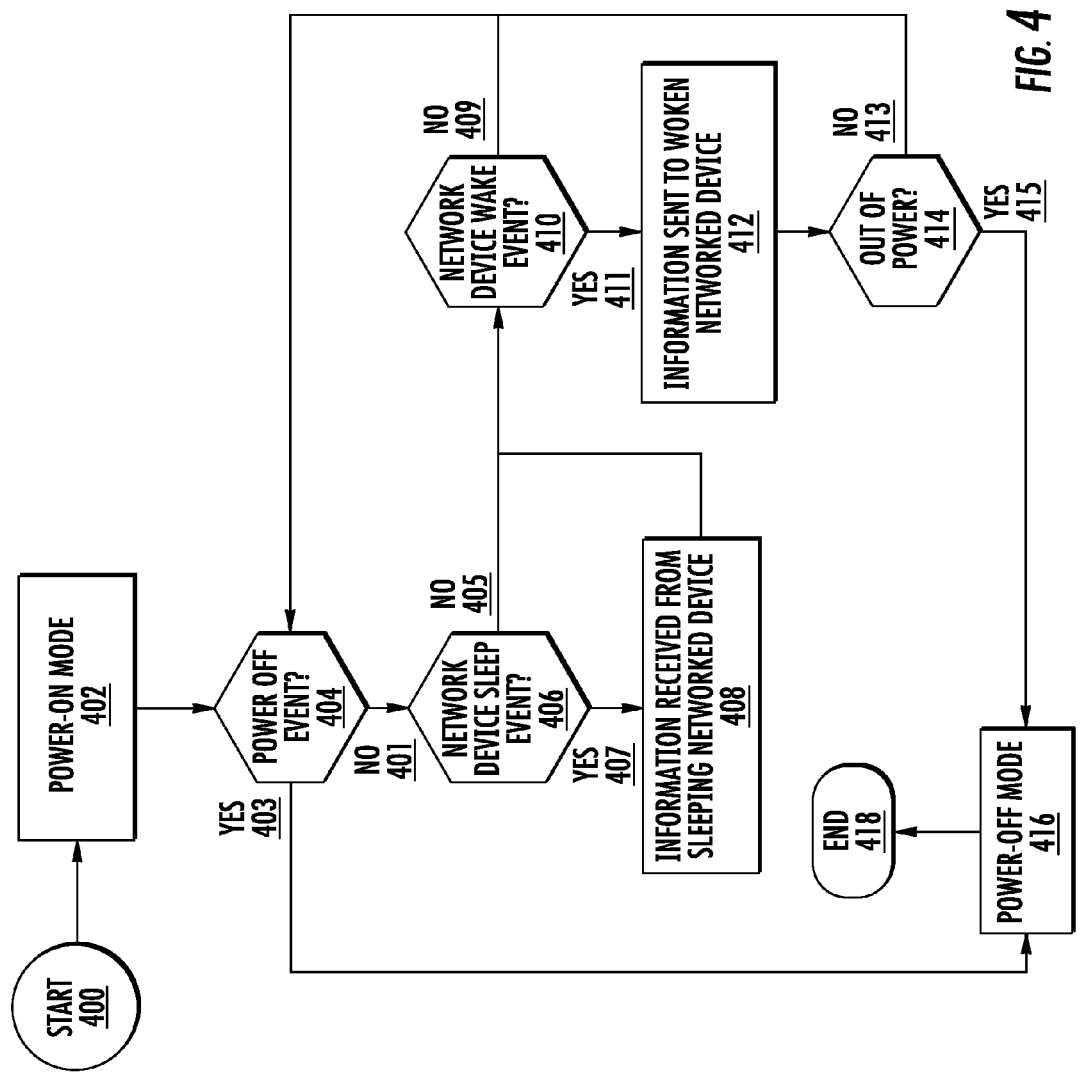
FIG. 4 is a flow chart for a substantially powered device that receives/sends offloaded information from/to devices going through sleep/wake cycles according to embodiments of the disclosed subject matter.

FIG. 4 is a flow chart for a substantially powered device that receives/sends offloaded information from/to devices going through sleep/wake cycles according to embodiments of the disclosed subject matter. More specifically, FIG. 4 is a flow chart for a substantially powered hub device 100-2 that receives/sends information from/to a networked device 100-1. In this embodiment, the hub device 100-2 is substantially powered, meaning that it is plugged into a continuous power supply or an uninterruptible power supply. As such, this embodiment envisions that the hub device 100-2 will always be available to the networked device 100-1, except for maybe maintenance situations and force majeure.

The process begins at Step 400 followed by Step 402 in which the hub device 100-2 enters a power-on mode or state. In some embodiments, a power-on mode for a hub device may be a type of wake mode and similarly a power-off mode for a hub device may be a type of sleep mode. The process continues to Step 404 in which the hub device 100-2 determines if it has received a power-off event. The power-off event could be in response to input received at the hub device 100-2 to turn the device off or in response to a timer. If the hub device 100-2 has received a power-off event (Path 403), then the device enters into a power-off mode (Step 416) and the process is complete (Step 418).

If a power-off event has not received (Path 401), then the hub device 100-2 checks to see if it a networked device sleep event has occurred (Step 406). There can be different types of occurrences of networked device sleep events. In some embodiments, when the networked device 100-1 is preparing for sleep mode, it sends a lightweight or low-level sleep signal to the hub device 100-2 which triggers the hub device 100-2 to request the networked device 100-1 to send it the offloaded information. In other embodiments, the hub device 100-2 polls the devices in the network to determine if they are preparing for a sleep mode and requests the information from the networked device 100-1 accordingly. In yet further embodiments, the networked device 100-1 just sends the information to the hub device 100-2 when it prepares for sleep mode. A networked device 100-1 can be said to be preparing for sleep mode if the networked device 100-1 has received a sleep event 304.

If a networked device sleep event has occurred (Path 407), then the hub device 100-2 receives the information from networked device 100-1 that is preparing for sleep mode (Step 408).

After the information has been received (Step 408) or if no networked device sleep event occurred (Path 405), the hub device 100-2 then checks to see if a networked device wake event has occurred (Step 410). There can be different types of occurrences of networked device wake events. In some embodiments, when the networked device 100-1 wakes, it sends a lightweight or low-level wake signal to the hub device 100-2 which triggers the hub device 100-2 to send the information to the networked device 100-1. In other embodiments, the hub device 100-2 polls the networked devices to determine when they have returned to a wake state and promptly sends them the respective information. In yet further embodiments, the networked device 100-1 specifically requests the information to be returned from the hub device 100-2. If a networked device wake event has occurred (Path 411), hub device 100-2 sends the respective information to the woken networked device (Step 412).

The hub device 100-2 then checks to see if it is out of power (Step 414). Again, since the hub device 100-2 is substantially powered, the hub device 100-2 will most likely not be out of power. If it is (Path 415), then the device enters into a power-off mode (Step 416) and the process is complete (Step 418). If not (Path 413) or if no networked device wake event occurred (Path 409), then the process proceeds to Step 404 and repeats.

Figure 5:
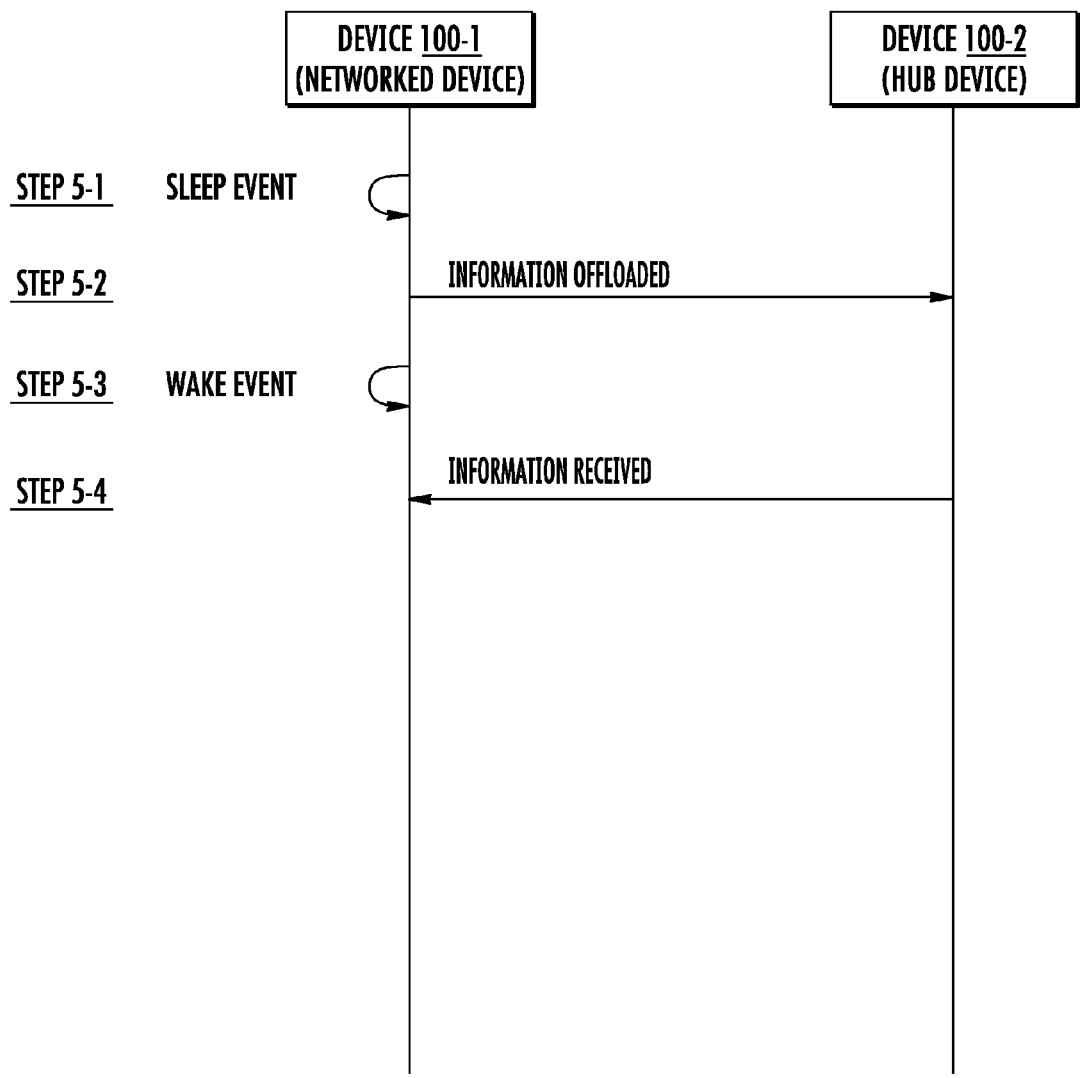
FIG. 5 is a flow diagram outlining the flow of information between devices going through sleep/wake cycles and a device receiving offloaded information according to embodiments of the disclosed subject matter.

FIG. 5 is a flow diagram outlining the flow of information between devices going through sleep/wake cycles and a device receiving offloaded information according to embodiments of the disclosed subject matter. FIG. 5 shows two devices in a system according to one embodiment of the present invention, the networked device 100-1 and the hub device 100-2. In Step 5-1, the networked device receives a sleep event, as described in FIG. 3 above. In response to the sleep event, it offloads its information to the hub device 100-2 (Step 5-2). Then the networked device 100-1 receives a wake event, again, as described in FIG. 3 above (Step 5-3). In response, the networked device 100-1 receives the information it had offloaded from the hub device 100-2 (Step 5-4).

Figure 6:
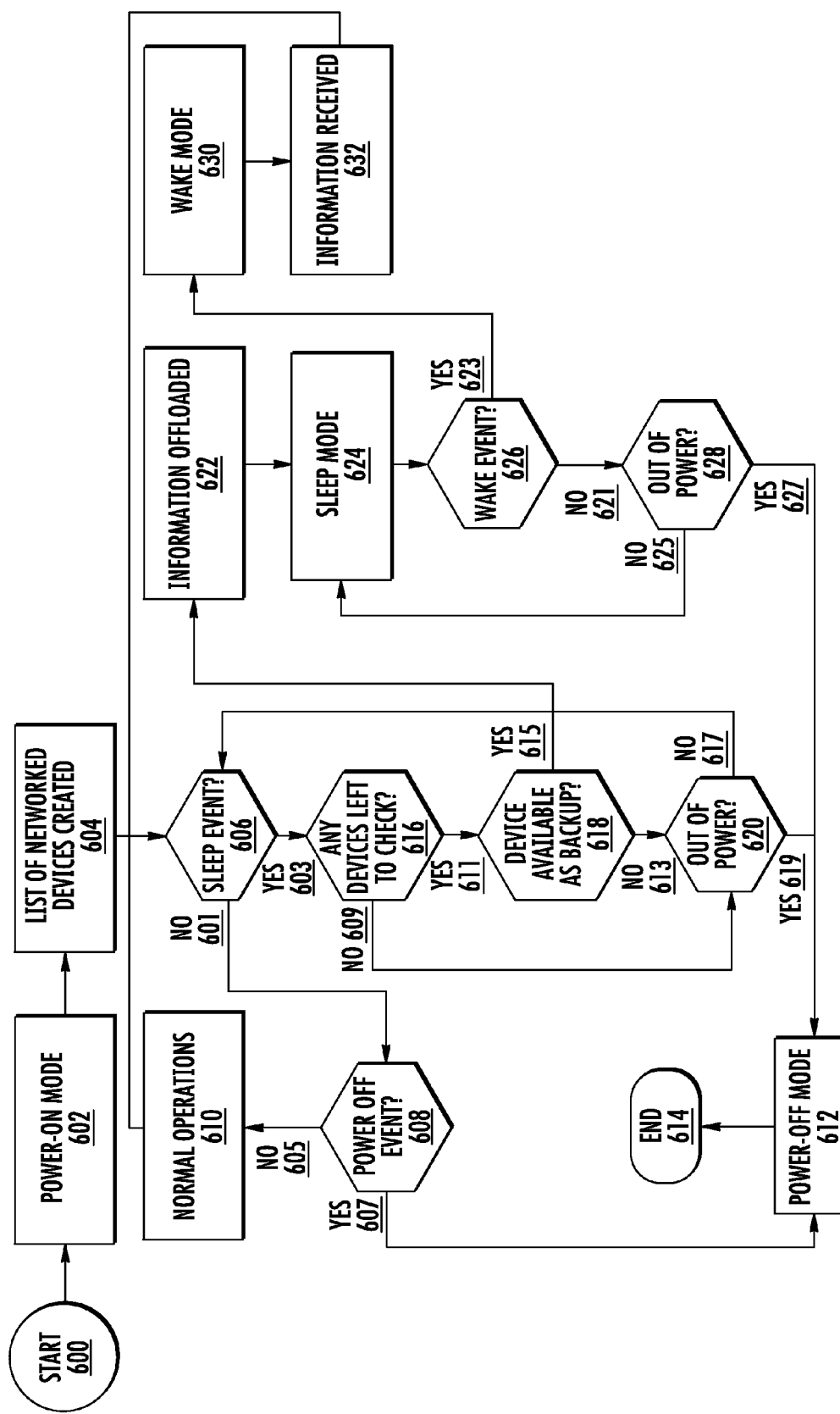
FIG. 6 is a flow chart for a device that goes through a sleep/wake cycle according to embodiments of the disclosed subject matter.

FIG. 6 is a flow chart for a device that goes through a sleep/wake cycle according to embodiments of the disclosed subject matter. FIG. 6 is similar to FIG. 3, however, in this embodiment, there is no substantially powered hub device 100-2 to serve as the backup device to receive offloaded information from the networked devices. Rather, in this embodiment, there is just a system of networked devices 100-1 through 100-N, and as needed, the networked devices 100-X identify and select another networked device 100-Y to serve as the backup device for offloading information. FIG. 6 is a flow chart documenting the operation of the network devices according to this embodiment. More specifically, in this embodiment, a networked device 100-1 goes to sleep and offloads its information to another networked device 100-2. Another unique aspect about this embodiment is that since there is no dedicated backup device like the hub device of the embodiment described by FIG. 3 through FIG. 5, the networked devices need to be aware of each other in order to have the ability to identify and select a backup device.

The process begins at Step 600 followed by Step 602 in which the networked device 100-1 enters a power-on mode or state. As discussed before, in some embodiments, a power-on mode for a networked device may be a type of wake mode and similarly a power-off mode for a networked device may be a type of sleep mode. The process continues to Step 604 in which the networked device 100-1 creates a list of other networked devices in the system.

In one embodiment, the networked device 100-1 polls for the other devices in the network to create the list of potential devices to offload information, i.e. the backup list. In other embodiments, the creation of the backup list is part of the normal operations of the networked device (Step 610). In other embodiments, the networked devices can broadcast their information to the other devices in the network so that each networked device can assemble its own backup list. In still further embodiments, the networked devices can announce when they go offline and are no longer available to serve as a backup device for the other networked devices so that the respective backup lists on each networked device can be updated accordingly. In still other embodiments, it is possible to have a central backup list stored on a device that is not a networked device of the system but that all networked devices can access.

And in more embodiments, the lists are dynamically updated with relevant information that would assist any given networked device with selecting a backup device in the network, such as, but not limited to, current power level and storage capacity of the potential backup device. In other embodiments, the information relevant to the criteria for selecting a backup device is assembled by each individual networked device by polling each of the other networked devices. In some embodiments, the information relevant to the criteria for selection is stored in the central backup list stored on a remote device accessible by all networked devices.

There are different ways in which the backup lists can identify the networked devices in the system. In some embodiments, the identifier can be a network identifier such as an Internet Protocol address (IP address) or a Media Access Control address (MAC address). In other embodiments, the identifier can be a radio frequency identifier, such as an near field communication (NFC) tag, a radio frequency identification (RFID) tag, or a Bluetooth address. In some embodiments, the identifier can be a system-wide unique name for a networked device, and there can be a supplementary system that allows networked devices to lookup connectivity information for associated unique names. In more embodiments, the identifier is a uniform resource locator (URL).

Next, the networked device 100-1 determines if it has received a sleep event (Step 606). In some embodiments, the sleep event occurs in response to an input received at the networked device 100-1, such as through the touch display 142 or the keypad 144. In other embodiments, the sleep event occurs in response to the low power level of the device as indicated by the power system 120, such as a low battery level for the device. In still further embodiments, the sleep event occurs in response to a timer as indicated by the clock system 130, such as a directive to sleep after three minutes of operation. In another embodiment, the sleep event occurs in response to an absence of a proximity event. For example, the networked device 100-1 enters a sleep mode in response to the absence of sound (as indicated by the audio input 153) or the absence of motion (as indicated by the optical sensors 146, such as traditional cameras or thermal cameras). In more embodiments, the sleep event occurs in response to a message sent from another networked device to the networked device 100-1 over the communication interfaces, e.g. the RF circuitry 152 and/or external ports 160.

If no sleep event has been received (Path 601), then the device determines if it has received a power-off event (Step 608). The power-off event could be in response to input received at the networked device 100-1 to turn the device off or in response to a message received from a network administrator. If there is a power-off event (Path 607), then the networked device 100-1 enters the power-off mode (Step 612) and the process is complete (Step 614). If there is no power-off event (Path 605), then the networked device 100-1 continues its normal operations (Step 610) and continues to check for sleep events (Step 606) and power-off events (Step 608). The normal operations of the networked device 100-1 depend on the nature and design of the device. By way of a non-limiting example, in the case where the networked device 100-1 is a smart tag in a grocery store, the normal operation could include activities such as displaying product information, displaying pricing information, displaying sales or promotional information, issuing sales information (such as dispensing coupons), displaying device information, and collecting sensor data.

Returning to Step 606, if there is a sleep event (Path 603), then the networked device 100-1 determines if there are any networked devices in the backup list that remain to be checked in terms of availability to serve as a backup device and receive offloaded information from the networked device 100-1 (Step 616).

If there are no more networked devices in the backup list to check (Path 609), then the networked device 100-1 checks to see if it has run out of power (Step 620), and if so (Path 619), it enters a power-off mode (Step 612) and the process is complete (Step 614). If the networked device 100-1 has not run out of power (Path 617), then the networked device 100-1 continues to check for sleep events (Step 606) and power-off events (Step 608) and proceeds with normal operations (Step 610) while those events are absent.

If there are networked devices in the backup list to check (Path 611), then the networked device 100-1 selects an identifier from the backup list and determines if that device is available to serve as a backup (Step 618). As described earlier, there are many embodiments for determining the availability of another networked device to serve as a backup device, including but not limited to confirming that the candidate networked device is in a wake mode and has sufficient power capacity and storage capacity to safeguard the offloaded information from the networked device 100-1. Further, there are different embodiments for navigating and selecting identifiers from the backup list. In some embodiments, there may be networked devices delineated as "favorite" devices to serve as backup devices. In alternative embodiments, the list could default to newer devices added to the network to be the initial backup candidates.

If the networked device selected from the backup list is not available to serve as a backup device (Path 613), then the networked device 100-1 checks to see if it has run out of power (Step 620), and if so (Path 619), it enters a power-off mode (Step 612) and the process is complete (Step 614). If the networked device 100-1 has not run out of power (Path 617), then the networked device 100-1 continues to check for sleep events (Step 606), if the networked device 100-1 has still received a sleep event, then it returns to Step 616 and selects another identifier from the backup list and determines if that device is available to serve as a backup (Step 618).

If the networked device 100-1 successfully identifies another networked device, say networked device 100-2, to serve as a backup device (Path 615), then the networked device 100-1 offloads information to the networked device 100-2 (Step 622) and enters a sleep mode (Step 624). The information offloaded by the networked device 100-1 depends on the nature and design of the device. The information includes, but is not limited to, information about the operation of the device, for example the total operational time of the device, information about the timing and duration of sleep and wake cycles of the device, information about installed software applications and operating systems and respective patches or updates, information about the state and operation of the sensors, data collected by the sensors, data collected from touch screens or keypads of the device, information on communications between the device and other devices in the network, and the like. In some embodiments, the information offloaded is the type of information that is not normally retained when a device enters sleep mode (such as information in transitory or volatile memory), but embodiments of the present invention are note limited thereto.

There are different embodiments for offloading information from the networked device 100-1 to the hub device 100-2. In some instances, the data may be transmitted as one or more files. In other embodiments, the information may be compressed to reduce the bandwidth of the transmission. In secure situations, the transmission may be encrypted or layered with other security mechanisms understood in the art to secure data transmissions.

During sleep mode, the networked device 100-1 checks for a wake event (Step 626). If there is no wake event (Path 621), then the networked device 100-1 checks to see if it is out of power (Step 628). If the networked device 100-1 is out of power (Path 627), then the networked device 100-1 enters the power-off mode (Step 612) and the process is complete (Step 614).

If the networked device 100-1 is not out of power (Path 625), then the device remains in sleep mode (Step 624) and checks again for a wake event (Step 626). If the networked device 100-1 receives a wake event (Path 623), then the device enters a wake mode (Step 630) and receives the all or some subset of information that had been previously offloaded to the networked device 100-2 (Step 632).

In some embodiments, the wake event occurs in response to an input received at the networked device 100-1, such as through the touch display 142 or the keypad 144. In other embodiments, the wake event occurs in response to the addition of a power supply to the device as indicated by the power system 120. In still further embodiments, the wake event occurs in response to a timer as indicated by the clock system 130, such as a directive to wake after three minutes in sleep mode. In another embodiment, the wake event occurs in response to a proximity event. For example, the networked device 100-1 enters a wake mode in response to the detection of sound (as indicated by the audio input 153) or the detection of motion (as indicated by the optical sensors 146, such as traditional cameras or thermal cameras). In more embodiments, the wake event occurs in response to a message sent from the backup device, e.g. the networked device 100-2 to the networked device 100-1 over the communication interfaces, e.g. the RF circuitry 152 and/or external ports 160.

The information may be received by the networked device 100-1 from the backup networked device 100-2 according to a push or pull model or some combination therein. In some embodiments, when the networked device 100-1 wakes, it sends a lightweight or low-level wake signal to the backup networked device 100-2 which triggers the backup networked device 100-2 to send the information to the networked device 100-1. In other embodiments, the backup networked device 100-2 polls the networked devices to determine when they have returned to a wake state and promptly sends them the respective information. In yet further embodiments, the networked device 100-1 specifically requests the information to be returned from the backup networked device 100-2.

As indicated earlier, in some embodiments, the information returned to the networked device 100-1 from the backup networked device 100-2 may be a subset of the information originally offloaded. For example, in some embodiments, it may not be necessary to return information to the networked device 100-1 about installed software applications and operating systems and respective patches or updates, since the networked device 100-1 can readily obtain that information again. In other embodiments, though, the information offloaded to the backup networked device 100-2 may not be recoverable from the networked device 100-1 itself, such as information that had been collected from sensors on the device. It may be important to return such data for completion, such as returning information on sleep and wake cycles of the device so that a monthly profile of usage of the networked device 100-1 can be ascertained.

After the networked device 100-1 has entered a wake state (Step 630) and received the information it had offloaded (Step 632), the process repeats, with the networked device 100-1 continues to check for sleep events (Step 606) and power-off events (Step 608) and proceeds with normal operations (Step 610) while those events are absent.

Figure 7A:
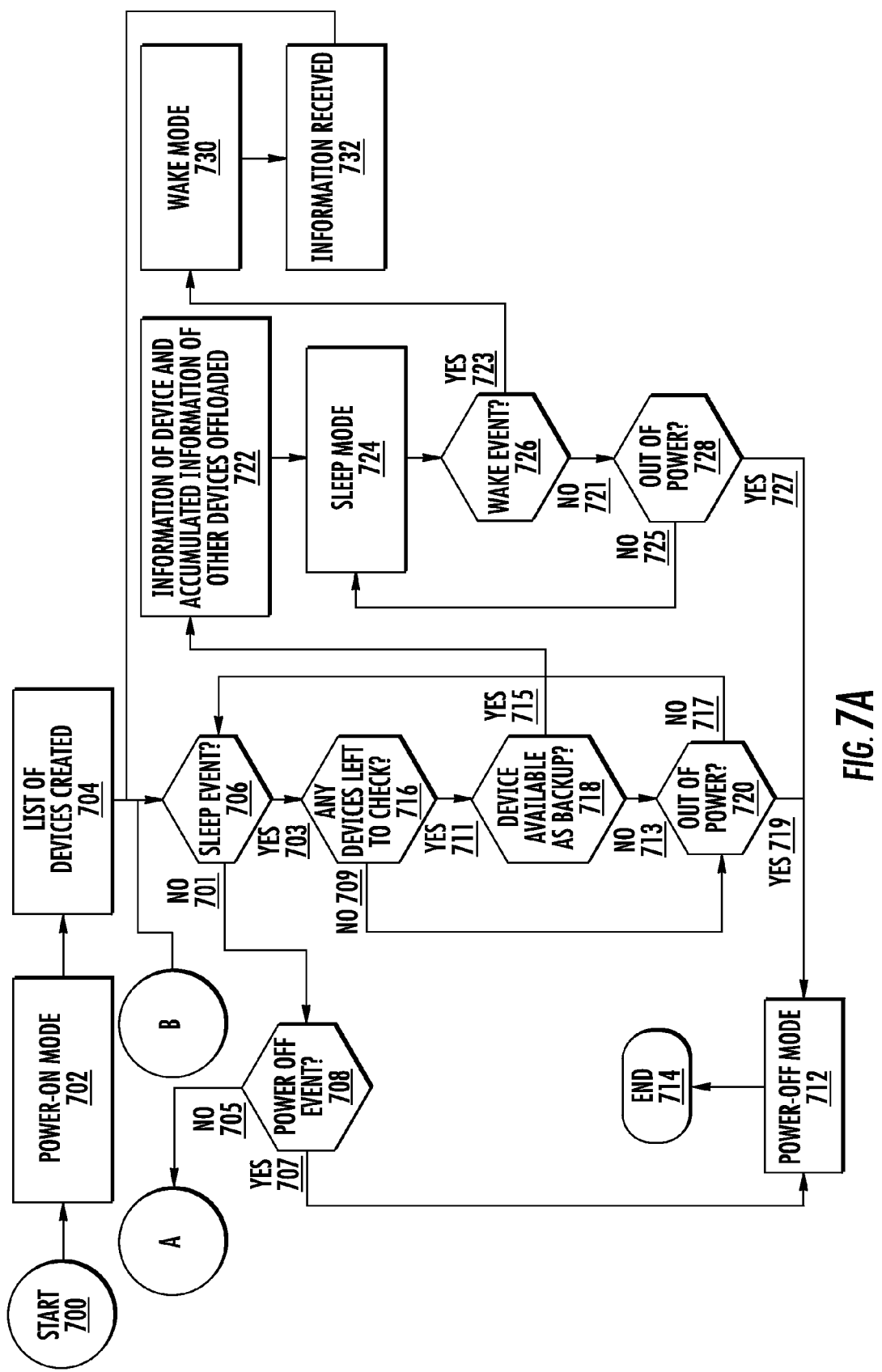
FIG. 7A and FIG. 7B are flow charts for a device that receives/sends offloaded information from/to devices going through sleep/wake cycles according to embodiments of the disclosed subject matter.
Figure 7B:
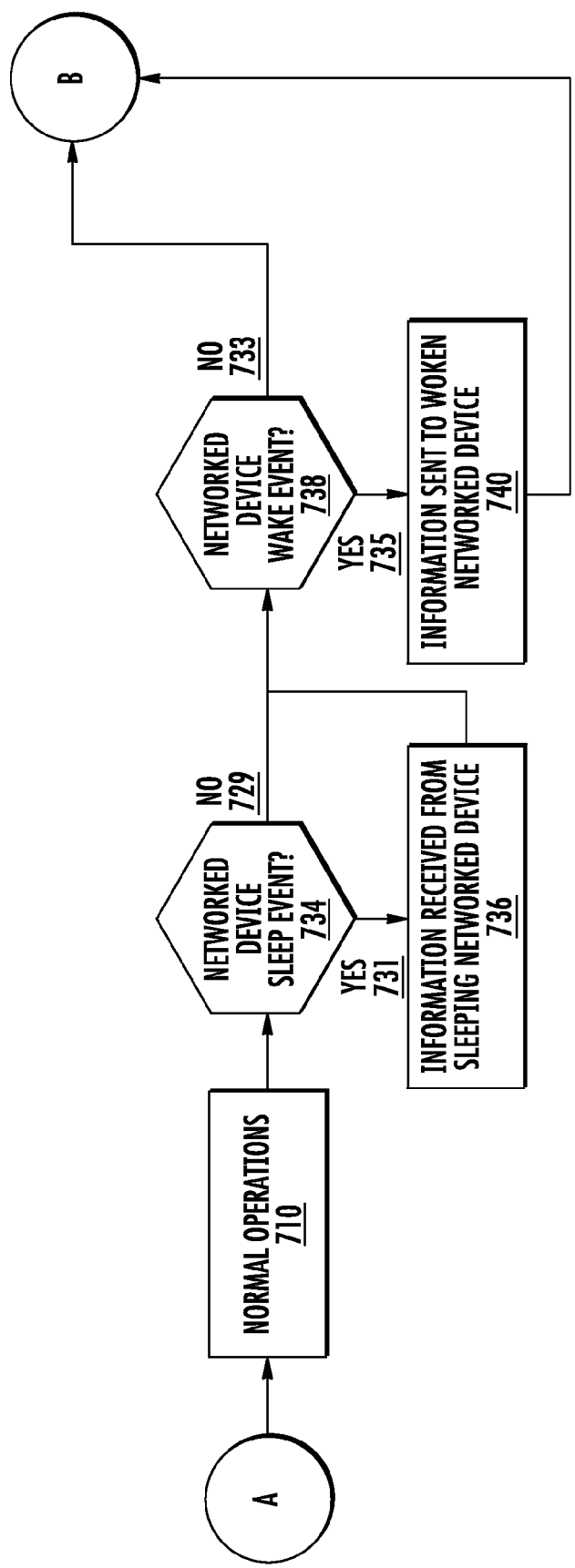

FIG. 7A and FIG. 7B are flow charts for a device that receives/sends offloaded information from devices going through sleep/wake cycles according to embodiments of the disclosed subject matter. More specifically, FIGS. 7A and 7B describe the operation of the networked device 100-2 that was selected by another networked device 100-1 to serve as backup for offloading information as described in FIG. 6.

Since the networked device 100-2 that is acting as a backup for other networked devices 100-1 is still a networked device, it operates identically to the manner described in FIG. 6, with a few exceptions. In other words, aside from the few exceptions described below, it should be understood that the corresponding steps and paths of the flow chart of FIGS. 7A and 7B are identical to those described above for FIG. 6 (i.e. Step 604 is equivalent to Step 704, Step 606 is equivalent to Step 706, Path 603 is equivalent to Path 703, etc.).

The primary differences between the networked device 100-2 acting as a backup device as described in FIGS. 7A and 7B and the networked device 100-1 being backed up as described in FIG. 6 are centered around how the backup device handles the backup of information from other devices and what it does with its own information and the accumulated offloaded information from other networked devices when it enters a low power consumption state.

The first distinction between FIGS. 7A & 7B and FIG. 6 occurs with Step 722 of FIG. 7A. In Step 722, it should be noted that the networked device 100-2 acting as the backup device possesses not only its own information but the accumulated information of other networked devices, like network device 100-1, which have offloaded their information to it. Therefore, when network device 100-2 receives a sleep event (Step 706) and then identifies a backup device (Step 718), it offloads not only its information but the accumulated information of the other devices (Step 722). For example, if networked device 100-2 acts as a backup device for networked device 100-1 and 100-N, then it now has its information as well as the information from networked devices 100-1 and 100-N. When networked device 100-2 then enters a sleep mode, it must offload its information as well as that of networked devices 100-1 and 100-N to a new networked device, say networked device 100-3. Continuing with this example, it should be noted that when networked device 100-2 wakes, it only receives back the offloaded information pertinent to itself and not the offloaded information of the devices for which it had previously served as a temporary backup, namely networked devices 100-1 and 100-N, as the new networked device 100-3 has already or will deliver that information back to networked device 100-1 and 100-N.

The second distinction between FIGS. 7A & 7B and FIG. 6 occurs with Path 705 of FIG. 7A. From Path 705, the process follows connector A to FIG. 7B. At this point, the networked device 100-2 performs its normal operations (Step 710), as similarly described for Step 610 of FIG. 6. Additionally, though, networked device 100-2 checks to see if it a networked device sleep event has occurred (Step 734).

There can be different types of occurrences of networked device sleep events. In some embodiments, when the networked device 100-1 is preparing for sleep mode, it sends a lightweight or low-level sleep signal to the networked device 100-2 which triggers the networked device 100-2 to request the networked device 100-1 to send it the offloaded information. In other embodiments, the networked device 100-2 polls the devices in the network to determine if they are preparing for a sleep mode and requests the information from the networked device 100-1 accordingly. In yet further embodiments, the networked device 100-1 just sends the information to the networked device 100-2 when it prepares for sleep mode. A networked device 100-1 can be said to be preparing for sleep mode if the networked device 100-1 has received a sleep event 606.

If a networked device sleep event has occurred (Path 731), then the networked device 100-2 receives the information from networked device 100-1 that is preparing for sleep mode (Step 736).

After the information has been received (Step 736) or if no networked device sleep event occurred (Path 729), the networked device 100-2 then checks to see if a networked device wake event has occurred (Step 738).

There can be different types of occurrences of networked device wake events. In some embodiments, when the networked device 100-1 wakes, it sends a lightweight or low-level wake signal to the networked device 100-2 which triggers the networked device 100-2 to send the information to the networked device 100-1. In other embodiments, the networked device 100-2 polls the networked devices to determine when they have returned to a wake state and promptly sends them the respective information. In yet further embodiments, the networked device 100-1 specifically requests the information to be returned from the networked device 100-2. If a networked device wake event has occurred (Path 735), networked device 100-2 sends the respective information to the woken networked device (Step 740). Since networked device 100-2 may be acting as a backup for several devices, not just networked device 100-1, it off course will only return offloaded information to the networked device that was the original source of that information. In some embodiments, though, such as failure of a networked device, the networked device 100-2 may return the offloaded information to a new device that is being introduced to the network as a replacement for the failed device.

After the information has been sent (Step 740) or if no networked device wake event occurred (Path 733), the process follows connector B to FIG. 7A, where the networked device 100-2 then continues to check for sleep events (Step 706) and power-off events (Step 708) and proceeds with normal operations (Step 710) while those events are absent.

FIG. 8 is a flow diagram outlining the flow of information between devices going through sleep/wake cycles and a device receiving offloaded information according to embodiments of the disclosed subject matter. More specifically, FIG. 8 shows three networked devices (100-1, 100-2, and 100-N) according to one embodiment of the present invention. FIG. 8 outlines the communication flow between a networked device 100-1 that enters sleep mode and offloads its information to networked device 100-2 and the receives that information back upon wake.

In Step 8-1, networked device 100-1 detects the presence of networked device 100-2, and in Step 8-2, networked device 100-1 detects the presence of networked device 100-N. As described earlier, there are several methods for device detection in the creation of the backup list (i.e. the list of the other devices in the network to potentially offload information), including, but not limited to polling for other devices in the network, identifying other devices in the network as part of normal operations, and receiving announcements and/or broadcasts from other devices on the network regarding their presence and/or abilities. In other embodiments, device detection is not required by networked device 100-1 as it may be able to access or retrieve a backup list maintained on and by a remote device.

In Step 8-3, networked device 100-1 then creates a list of potential backup devices on the network. In Step 8-4, networked device 100-1 then receives a sleep event. Networked device 100-1 checks its backup list and begins determining the availability of the devices on its list to serve as a backup. In Step 8-6, networked device 100-1 checks to see if networked device 100-N is available to serve as a backup. Since networked device 100-N has already gone to sleep (Step 8-5), it is not available to serve as backup, and so then in Step 8-7, networked device 100-1 checks to see if networked device 100-2 is available to serve as a backup (Step 8-7). Since it is, networked device 100-1 offloads its information to network device 100-2 (Step 8-8). At some point later, after networked device 100-1 receives a wake event (Step 8-9), it receives the offloaded information back from networked device 100-2 (Step 8-10).

Figure 9:
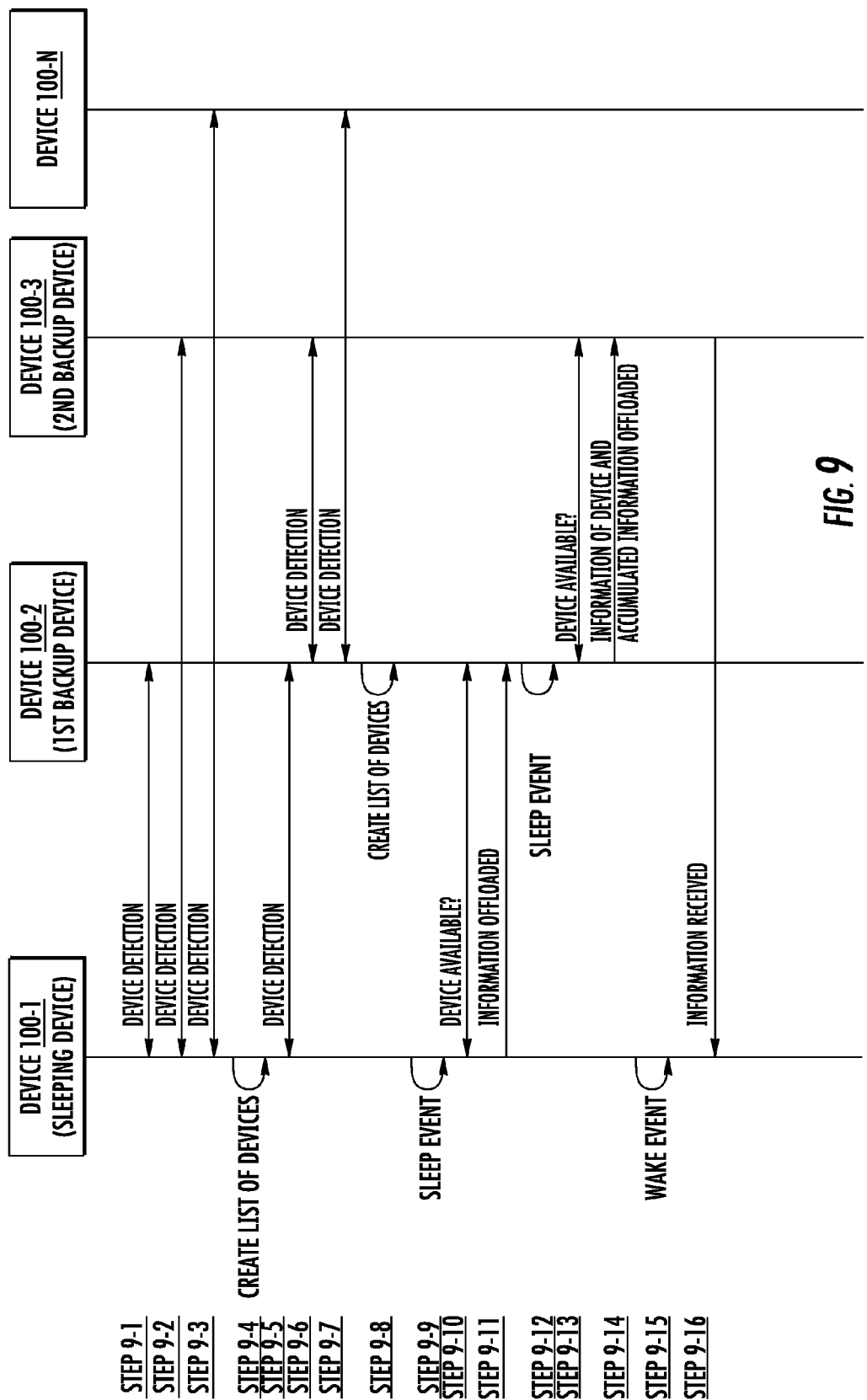
FIG. 9 is a flow diagram outlining the flow of information between devices going through sleep/wake cycles and devices receiving offloaded information according to embodiments of the disclosed subject matter.

FIG. 9 is a flow diagram outlining the flow of information between devices going through sleep/wake cycles and devices receiving offloaded information according to embodiments of the disclosed subject matter. More specifically, FIG. 9 shows four networked devices (100-1, 100-2, 100-3, and 100-N) according to one embodiment of the present invention. FIG. 9 outlines the communication flow between a networked device 100-1 that enters sleep mode and offloads its information to networked device 100-2, which then enters sleep mode and offloads its information to networked device 100-3 such that when networked device 100-1 wakes, it receives its information back from network device 100-3.

In Steps 9-1, 9-2, and 9-3, networked device 100-1 detects the presence of networked device 100-2, 100-3, and 100-N respectively in order to create a list of devices (Step 9-4). Similarly, in Steps 9-5, 9-6, and 9-7, networked device 100-2 detects the presence of networked device 100-1, 100-3, and 100-N respectively in order to create a list of devices (Step 9-8). As described earlier, there are several methods for device detection in the creation of the backup list (i.e. the list of the other devices in the network to potentially offload information), including, but not limited to polling for other devices in the network, identifying other devices in the network as part of normal operations, and receiving announcements and/or broadcasts from other devices on the network regarding their presence and/or abilities. In other embodiments, device detection is not required by networked device 100-1 as it may be able to access or retrieve a backup list maintained on and by a remote device.

In Step 9-9, networked device 100-1 then receives a sleep event. Networked device 100-1 checks its backup list and begins determining the availability of the devices on its list to serve as a backup. In Step 9-10, networked device 100-1 checks to see if networked device 100-2 is available to serve as a backup. Since it is, networked device 100-1 offloads its information to network device 100-2 (Step 9-11).

In Step 9-12, networked device 100-2 then receives a sleep event. Networked device 100-2 checks its backup list and begins determining the availability of the devices on its list to serve as a backup. In Step 9-13, networked device 100-2 checks to see if networked device 100-3 is available to serve as a backup. Since it is, networked device 100-2 offloads its information and the information it is backing up for networked device 100-1 to network device 100-3 (Step 9-14). At some point later, after networked device 100-1 receives a wake event (Step 9-15), it receives the offloaded information back from networked device 100-3 (Step 9-16).

The disclosed subject matter may be embodied as devices, systems, methods, and/or computer program products. Accordingly, some or all of the disclosed subject matter may be embodied in hardware and/or in software (including firmware, resident software, microcode, state machines, gate arrays, etc.). Furthermore, the disclosed subject matter may take the form of a computer program product on a computer-usable or computer-readable storage medium having computer-usable or computer-readable program code embodied in the medium for use by or on conjunction with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnet, optical, electromagnetic, infrared, or semiconductor system, apparatus, device or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, Random Access Memory (RAM), Read-Only Memory (ROM), Electrically Erasable Programmable Read-Only Memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;

U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;

U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.);

U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.)

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system, comprising:
   a first device comprising:
      a first communication interface;
      a first control system communicatively coupled to the first communication interface and comprising at least one first hardware processor and a first memory storing program codes operable to:
         receive a first sleep event;
         identify a third device as available to receive first information;
         send the first information to the third device;
         enter a first sleep mode;
         receive a first wake event; and
         receive the first information from the third device; and
   a second device comprising:
      a second communication interface;
      a second control system communicatively coupled to the second communication interface and comprising at least one second hardware processor and a second memory storing program codes operable to:
         receive a second sleep event;
         identify the third device as available to receive second information;
         send the second information to the third device;
         enter a second sleep mode;
         receive a second wake event; and
         receive the second information from the third device; and
   a third device comprising:
      a third communication interface;
      a third control system communicatively coupled to the third communication interface and comprising at least one third hardware processor and a third memory storing program codes operable to:
         receive the first information from the first device;
         receive the second information from the second device;
         send the first information to the first device after the first wake event; and
         send the second information to the second device after the second wake event.

2. The system of claim 1, wherein the first, second, and third devices are selected from the group consisting of: cellular telephones, smart phones, personal digital assistants, tablets, pagers, two-way radios, netbooks, barcode scanners, radio frequency identification (RFID) readers, intelligent sensors, tracking devices, and smart tags.

3. The system of claim 1, wherein the first and second information are selected from the group comprising: information about the operation of the device, the total operational time of the device, information about the timing and duration of sleep and wake cycles of the device, information about installed software applications and operating systems and respective patches or updates, information about the state and operation of the sensors, data collected by the sensors, data collected from touch screens or keypads of the device, and information on communications between the device and other devices in the network.

4. The system of claim 1, wherein the first and second sleep events are selected from a group consisting of: in response to input received at the first and second devices respectively, in response to a low power state at the first and second devices respectively, in response to a timer at the first and second devices respectively, in response to an absence of a proximity event at the first and second devices respectively, and in response to a message from the third device to the first and second devices respectively.

5. The system of claim 1, wherein the first and second wake events are selected from a group consisting of: in response to input received at the first and second devices respectively, in response to the addition of a power supply to the first and second device respectively, in response to a timer at the first and second devices respectively, in response to a proximity event at the first and second devices respectively, and in response to a message from the third device to the first and second devices respectively.

6. The system of claim 1, wherein identifying the third device as available to receive information comprises:
   sending a request to the third device for information regarding the power and storage status of the third device;
   receiving information regarding the power and storage status of the third device; and
   determining, using the information regarding the power and storage status of the third device, if the third device is available to receive information.

7. The system of claim 1, wherein the third device is further operable to:
   receive a lightweight signal from the first device, wherein the lightweight signal is indicative of a wake state of the first device; and
   receive a lightweight signal from the second device, wherein the lightweight signal is indicative of a wake state of the second device.

8. The system of claim 1, wherein the third device is further operable to:
   poll the first device to determine if the first device is in a wake state before sending the first information to the first device; and
   poll the second device to determine if the second device is in a wake state before sending the second information to the second device.

9. The system of claim 1, wherein the third device is further operable to:
   receive a request from the first device for the first information; and
   receive a request from the second device for the second information.

10. The system of claim 1, wherein in sending the first information to the first device and the second information to the second device, the third device only sends a subset of the first and second information respectively.

11. A system, comprising:
    a first device comprising:
       a first communication interface;

a first control system communicatively coupled to the first communication interface and comprising at least one first hardware processor and a first memory storing program codes operable to:
  receive a first sleep event;
  identify a third device as available to receive first information;
send the first information to the third device;
enter a first sleep mode;
receive a first wake event; and
receive the first information from a fourth device; and
a second device comprising:
  a second communication interface;
  a second control system communicatively coupled to the second communication interface and comprising at least one second hardware processor and a second memory storing program codes operable to:
    receive a second sleep event;
    identify the third device as available to receive second information;
send the second information to the third device;
enter a second sleep mode;
receive a second wake event; and
receive the second information from the fourth device; and
a third device comprising:
  a third communication interface;
  a third control system communicatively coupled to the third communication interface and comprising at least one third hardware processor and a third memory storing program codes operable to:
receive the first information from the first device;
receive the second information from the second device;
  receive a third sleep event;
  identify the fourth device as available to receive the first, the second, and third information;
send the first, second, and third information to the fourth device;
enter a third sleep mode;
receive a third wake event; and
receive the third information from the fourth device; and
a fourth device comprising:
  a fourth communication interface;
  a fourth control system communicatively coupled to the fourth communication interface and comprising at least one fourth hardware processor and a fourth memory storing program codes operable to:
receive the first, second, and third information from the third device;
send the first information to the first device after the first wake event;
send the second information to the second device after the second wake event; and
send the third information to the third device after the third wake event.

12. A method of power management comprising:
receiving a first sleep event with a first device;
identifying a third device as available to receive first information from the first device;
sending the first information to the third device;
entering a first sleep mode with the first device;
receiving a first wake event with the first device;
receiving the first information from the third device after the first wake event;
receiving a second sleep event with a second device;
identifying the third device as available to receive second information from the second device;
sending the second information to the third device;
entering a second sleep mode with the second device;
receiving a second wake event with the second device;
receiving the second information from the third device after the second wake event.

13. The method of claim 12, wherein the third device is operable to:
receive the first information from the first device;
receive the second information from the second device;
send the first information to the first device after the first wake event; and
send the second information to the second device after the second wake event.

14. The method of claim 12, wherein the first, second, and third devices are selected from the group consisting of: cellular telephones, smart phones, personal digital assistants, tablets, pagers, two-way radios, netbooks, barcode scanners, radio frequency identification (RFID) readers, intelligent sensors, tracking devices, and smart tags.

15. The method of claim 12, wherein the first and second information is information about the operation of the device, the total operational time of the device, information about the timing and duration of sleep and wake cycles of the device, information about installed software applications and operating systems and respective patches or updates, information about the state and operation of the sensors, data collected by the sensors, data collected from touch screens or keypads of the device, information on communications between the device and other devices in the network, or any combination thereof.

16. The method of claim 12, wherein the first and second sleep events are in response to input received at the first and second devices respectively, in response to a low power state at the first and second devices respectively, in response to a timer at the first and second devices respectively, in response to an absence of a proximity event at the first and second devices respectively, in response to a message from the third device to the first and second devices respectively, or any combination thereof.

17. The method of claim 12, wherein the first and second wake events are in response to input received at the first and second devices respectively, in response to the addition of a power supply to the first and second device respectively, in response to a timer at the first and second devices respectively, in response to a proximity event at the first and second devices respectively, in response to a message from the third device to the first and second devices respectively, or any combination thereof.

18. The method of claim 12, wherein identifying the third device as available to receive first or second information comprises:
  sending a request to the third device for information regarding the power and storage status of the third device;
  receiving information regarding the power and storage status of the third device; and
  determining, using the information regarding the power and storage status of the third device, if the third device is available to receive information.

19. The method of claim 12, wherein the third device is further operable to:
  receive a lightweight signal from the first device, wherein the lightweight signal is indicative of a wake state of the first device; and
  receive a lightweight signal from the second device, wherein the lightweight signal is indicative of a wake state of the second device.

20. The method of claim 12, wherein the third device is further operable to:
- poll the first device to determine if the first device is in a wake state before sending the first information to the first device; and
- poll the second device to determine if the second device is in a wake state before sending the second information to the second device.

\* \* \* \* \*